(12) United States Patent
Chappalli et al.

(10) Patent No.: US 8,068,543 B2
(45) Date of Patent: Nov. 29, 2011

(54) METHOD AND SYSTEM FOR DETERMINING THE RELIABILITY OF ESTIMATED MOTION VECTORS

(75) Inventors: Mahesh Chappalli, Irvine, CA (US); Yeong-Taeg Kim, Irvine, CA (US); Zhi Zhou, Corona, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1568 days.

(21) Appl. No.: 11/453,675

(22) Filed: Jun. 14, 2006

(65) Prior Publication Data

US 2007/0291843 A1 Dec. 20, 2007

(51) Int. Cl.
*H04N 7/12* (2006.01)

(52) U.S. Cl. .................................................. 375/240.16
(58) Field of Classification Search ............. 375/240.16
See application file for complete search history.

(56) References Cited

U.S. PATENT DOCUMENTS

| 6,625,216 | B1 * | 9/2003 | Zhu | 375/240.16 |
| 6,970,605 | B1 * | 11/2005 | Kondo et al. | 382/254 |
| 7,227,896 | B2 * | 6/2007 | Sun | 375/240.16 |
| 2004/0258154 | A1 * | 12/2004 | Liu et al. | 375/240.16 |

* cited by examiner

*Primary Examiner* — David Czekaj

(57) ABSTRACT

A method and system for determining a measure of reliability of a computed motion estimate based on the histogram of the error block obtained based on the computed motion estimate taking into account some aspects of the image content.

49 Claims, 11 Drawing Sheets

Minimum SAD = 8977
Corresponding (vx, vy) = (-15, 1)

Minimum SAD = 39884
Corresponding (vx, vy) = (0, 0)

Minimum SAD = 31077
Corresponding (vx, vy) = (-16, 0)

FIG. 7A   Example of function $f_{pl}(.)$

FIG. 7C   Example of function $f_{ts}(.)$

Examples of functions $f_{ep1}(.)$, $f_{ep2}(.)$, and $f_{ep3}(.)$, respectively

METHOD AND SYSTEM FOR DETERMINING THE RELIABILITY OF ESTIMATED MOTION VECTORS

FIELD OF THE INVENTION

The present invention relates to image processing, and in particular to determining the reliability of estimated motion vectors in motion compensation/estimation for video images.

BACKGROUND OF THE INVENTION

Motion compensation is a widely employed evolving video image processing technology. Areas of application include image compression, transcoding, de-interlacing and frame rate conversion of video data. Motion estimation forms an integral and core component of any motion compensation method.

The goal of motion estimation is to estimate the motion of every pixel in a frame of video data under consideration ('current frame'), relative to pixels in other frame(s), in a sequence of video frames. In essence, motion estimation assigns to every pixel, motion information in the form of motion vectors (representing the motion in two dimensions i.e. horizontal and vertical) linked to other frame(s).

Many techniques and algorithms exist to obtain motion vectors, of which, block-matching based methods form a commonly-used subset. The basic principle of block-matching is to find a block (i.e., a group of pixels aligned in some pre-determined fashion e.g. rectangular, triangular, diamond-shaped shaped blocks) of data in the previous or any other frame which best matches the block under consideration in the current frame. The "best match" is decided in terms of a chosen metric such as mean-squared error (MSE), mean-absolute error (MAE), peak signal to noise ratio (PSNR), sum of squared errors (SSE), sum of absolute difference (SAD), etc. All pixels comprising the block under consideration in the current frame have the same motion vector.

Various other techniques such as optical flow also exist which determine the motion vector for a pixel or block, based on error metrics. FIGS. 1-4 show conventional approaches described below.

FIG. 1 illustrates a method of block-matching based motion estimation. If $B_{x,y}^t$ represents a block at location (x, y) in the current frame $I^t$ of size m×n pixels, and $B_{x+dx,y+dy}^{t-1}$ represents a block displaced from location (x, y) by (dx, dy) in the previous frame $I^{t-1}$ (also of size m×n pixels), then the SAD between the two blocks for the motion vector (dx, dy) is given by the expression (1):

$$SAD(dx, dy) = \sum_{i=0}^{m-1} \sum_{j=0}^{n-1} |B_{x,y}^t(i, j) - B_{x+dx,y+dy}^{t-1}(i, j)| \quad (1)$$

where $B_{x,y}^t(i,j)$ represents pixel (i, j) within the block (with this representation, location (0, 0) within the block refers to the block starting position of (x, y)).

One of the problems encountered in the process of motion estimation is the determination of the reliability of the computed motion vector. Intuitively, it appears that smaller values of the SAD represent better matches and hence more accurate motion vectors while large values of the SAD represent poor matches and consequently inaccurate motion vectors. Accordingly, the best motion vector (vx, vy) is the one that minimizes the SAD metric over all possible motion vectors.

Typically, a subset of all possible motion vectors (defined by a search area and search resolution), denoted by Δ, is used. Mathematically by expression (2):

$$SAD(vx, vy) \leq SAD(dx, dy), \text{ where } (dx, dy) \in \Delta \subset \mathfrak{R}^2 \quad (2)$$

where SAD(dx, dy) is computed as mentioned in expression (1). However, in practice, the range of SAD values for reliable matches shows much variation with content.

The example in FIG. 2 shows the SAD surface and lists the minimum SAD value and the corresponding motion vector for one block in a test video sequence for the case when the estimated motion vector represents the true motion. The example in FIG. 3 shows another example where the motion vector was correctly estimated. FIG. 4, on the other hand, shows an example of an unreliable motion vector due to multiple object motion within the block.

As can be seen from FIGS. 2-4, the SAD value alone does not provide any indication of the reliability of the estimated motion vector. Factors such as noise, dynamic range, high-frequency information, multiple objects with differing motion, and various others, affect the range of SAD values that can be termed as reliable matches. The use of incorrect motion vectors has detrimental effects in any application relying on motion estimation or compensation. For example, in compression systems, the use of incorrect motion vectors leads to lower output video quality for a given bit rate; in frame rate conversion and de-interlacing applications, the use of incorrect motion vectors for motion compensation results in visual artifacts in the output video. Thus, the determination of the reliability of the estimated motion vector plays a crucial role in obtaining high quality output video.

BRIEF SUMMARY OF THE INVENTION

The inability to clearly identify and distinguish true motion estimates from inaccurate ones on the basis of error metrics like the SAD and the resulting degradation of visual quality due to the use of incorrect motion vectors necessitates an estimation of the reliability of the computed motion vector.

In one embodiment, the present invention provides a method of determining a measure of reliability of a computed motion estimate based on the histogram of the error block obtained based on the computed motion estimate, taking into account some aspects of the image content.

In one example implementation, the present invention provides a technique which classifies the motion vectors/estimates as reliable when the SAD value corresponding to the best motion estimate is high based on image content. At the same time motion estimates in areas which fall at the boundary of objects with different motion, are classified as unreliable even if the SAD surface does not exhibit a very high value at the location corresponding to the best motion estimate.

These and other features, aspects and advantages of the present invention will become understood with reference to the following description, appended claims and accompanying figures.

BRIEF DESCRIPTION OF THE DRAWINGS

FIGS. 7A-C show examples of function $f_{p1}(.)$, functions $f_{ep1}(.)$, $f_{ep2}(.)$, and $f_{ep3}(.)$, and function $f_{ts}(.)$, respectively, in the system of FIG. 5, according to an embodiment of the present invention.

In the drawings, like references refer to similar elements.

DETAILED DESCRIPTION OF THE INVENTION

The inability to clearly identify and distinguish true motion estimates from inaccurate ones on the basis of error metrics such as SAD, and the resulting degradation of visual quality due to the use of incorrect motion vectors, necessitates an estimation of the reliability of the computed motion vector.

In one embodiment, the present invention provides a method of determining a measure of reliability of a computed motion estimate based on the histogram of the error block obtained based on the computed motion estimate, taking into account some aspects of the current video frame content.

In one example implementation, the present invention provides a technique which classifies the motion vectors/estimates as reliable when the SAD value corresponding to the best motion estimate is high based on image content. At the same time motion estimates in areas which fall at the boundary of objects with different motion, are classified as unreliable even if the SAD surface does not exhibit a very high value at the location corresponding to the best motion estimate.

Figure 5:
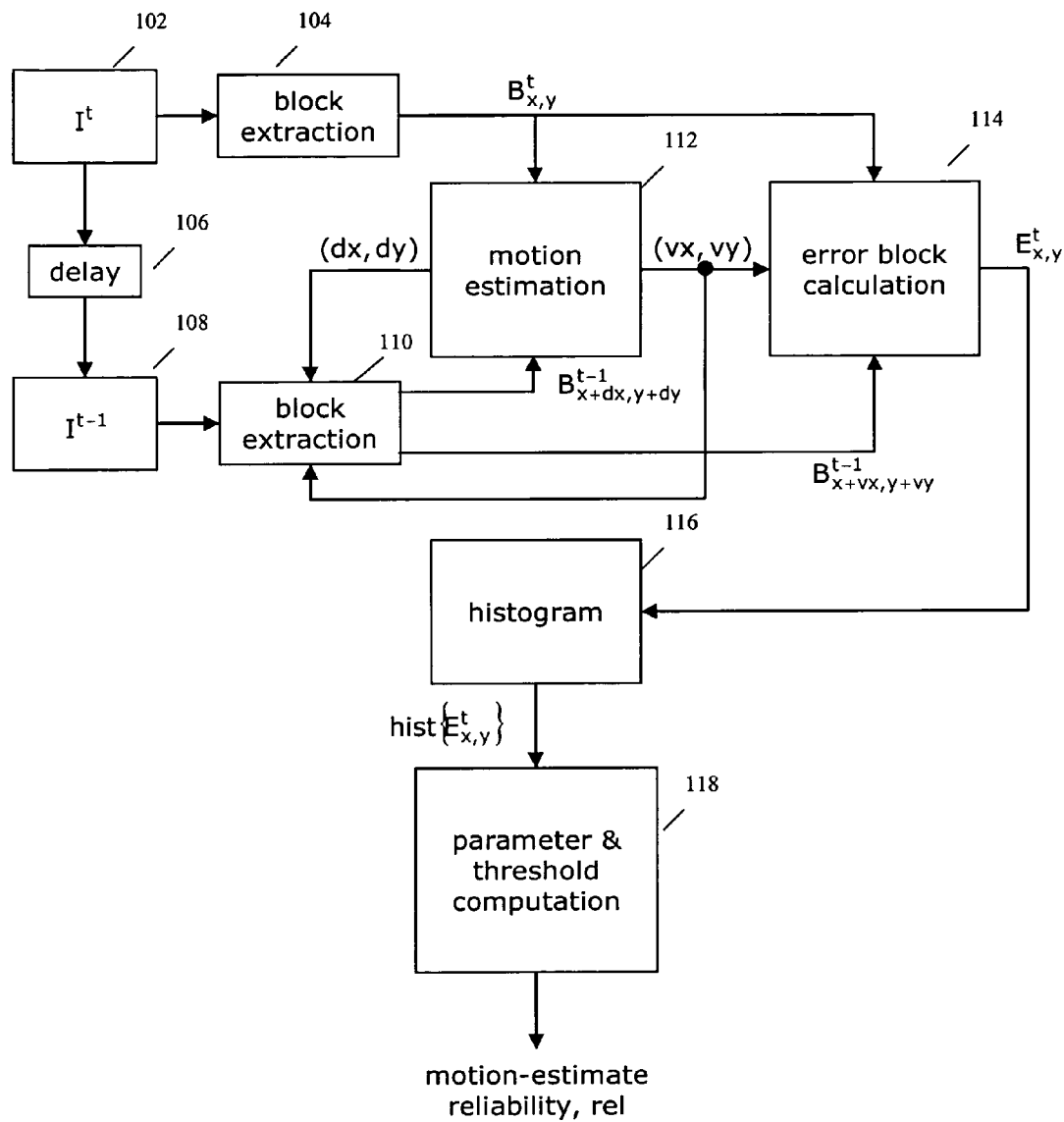
FIG. 5 shows a functional block diagram of a system implementing a method for determining the reliability of estimated motion vectors, according to an embodiment of the present invention.

FIG. 5 shows a functional block diagram of a system 100, according to an embodiment of the present invention, which determines reliability thresholds and a measure of the reliability of the current motion estimate using curves tuned to the specific target application. A functional description of the system 100 in FIG. 5 is provided below.

Block extraction unit 104 extracts block $B_{x,y}{}^t$ at location (x, y) in the current frame $I^t$ 102 of size m×n pixels. Delay unit 106 provides a delayed (previous) frame $I^{t-1}$ 108. Block extraction unit 110 extracts block $B_{x+dx,y+dy}{}^{t-1}$ displaced from location (x, y) by (dx, dy) in the previous frame $I^{t-1}$ 108 (also of size m×n pixels).

Motion estimation unit 112 receives blocks $B_{x,y}{}^t$ and $B_{x+dx,y+dy}{}^{t-1}$ for various values of $(dx, dy) \in \Delta \subset \Re^2$, and generates motion vector (vx, vy) which represents the motion estimate (i.e., best motion estimate) obtained per expression (2) above.

Error block calculation unit 114 inputs blocks $B_{x,y}{}^t$ and $B_{x+vx,y+vy}{}^{t-1}$, and motion estimate (vx, vy), and generates an error-block, $E_{x,y}{}^t$, according to expression (3):

$$E_{x,y}{}^t(i,j) = |B_{x,y}{}^t(i,j) - B_{x+vx,y+vy}{}^{t-1}(i,j)| \qquad (3)$$

where i=x, x+1, ..., x+m−1, j=y, y+1, ..., y+n−1.

The error-block, $E_{x,y}{}^t$, represents the degree of mismatch (absolute difference in value) between the original block $B_{x,y}{}^t$ and the best matched block $B_{x+vx,y+vy}{}^{t-1}$ (obtained using the motion estimate (vx, vy)) at each pixel location contained in the block (which is of size m×n pixels).

Histogram computation unit 116 generates (plots) a histogram y(k) from the obtained elements of the computed error block $E_{x,y}{}^t$. The sample values of the histogram y(k) (assuming K bins) can be represented by expression (4):

$$y(k) = \underset{k}{hist}(E_{x,y}^t(i,j)), \quad k = 0, 1, \ldots, K-1 \qquad (4)$$

where hist(.) is a histogram function

Once the sample values of the histogram y(k) are obtained, information about the shape (character) of the histogram y(k) is gathered by calculating the following parameters in computation unit 118:

end point, ep: represents the last non-zero bin in the histogram and provides a measure of the spread and magnitude of errors for the estimated motion vector.

peak value, pv: represents the maximum height (among all bins) of the histogram y(k) and is an indicator of the quality of the match between the original block $B_{x,y}{}^t$ and the best matched block $B_{x+vx,y+vy}{}^{t-1}$ (obtained using the motion estimate (vx, vy)) and the spread of the histogram y(k).

peak location, pl: represents the most frequently occurring error range in the computed error-block $E_{x,y}{}^t$; tolerances for small variations among occurrence frequencies exist, and preference is given to bins representing higher error ranges (up to a pre-determined bin index).

Further, a part of the histogram y(k) is identified as the tail and a fourth parameter, ts, is computed wherein:

tail strength, ts: represents the percentage of the histogram y(k) contained in the part identified as the tail of the histogram y(k) and provides an indication of the degree of mismatch caused due to the estimated motion vector, (vx, vy).

Based on these four parameters, the computation unit 118 further determines reliability thresholds and a measure of the reliability (rel) of the current motion estimate is obtained by the use of curves tuned to the specific target application.

Because the entries of the error block $E_{x,y}{}^t$ have a wide range of values (e.g., 0-255 for 8-bit data, or 0-1023 for 10-bit data, etc.), a histogram plotted directly using these values typically yields a curve with large local variations.

Figure 6:
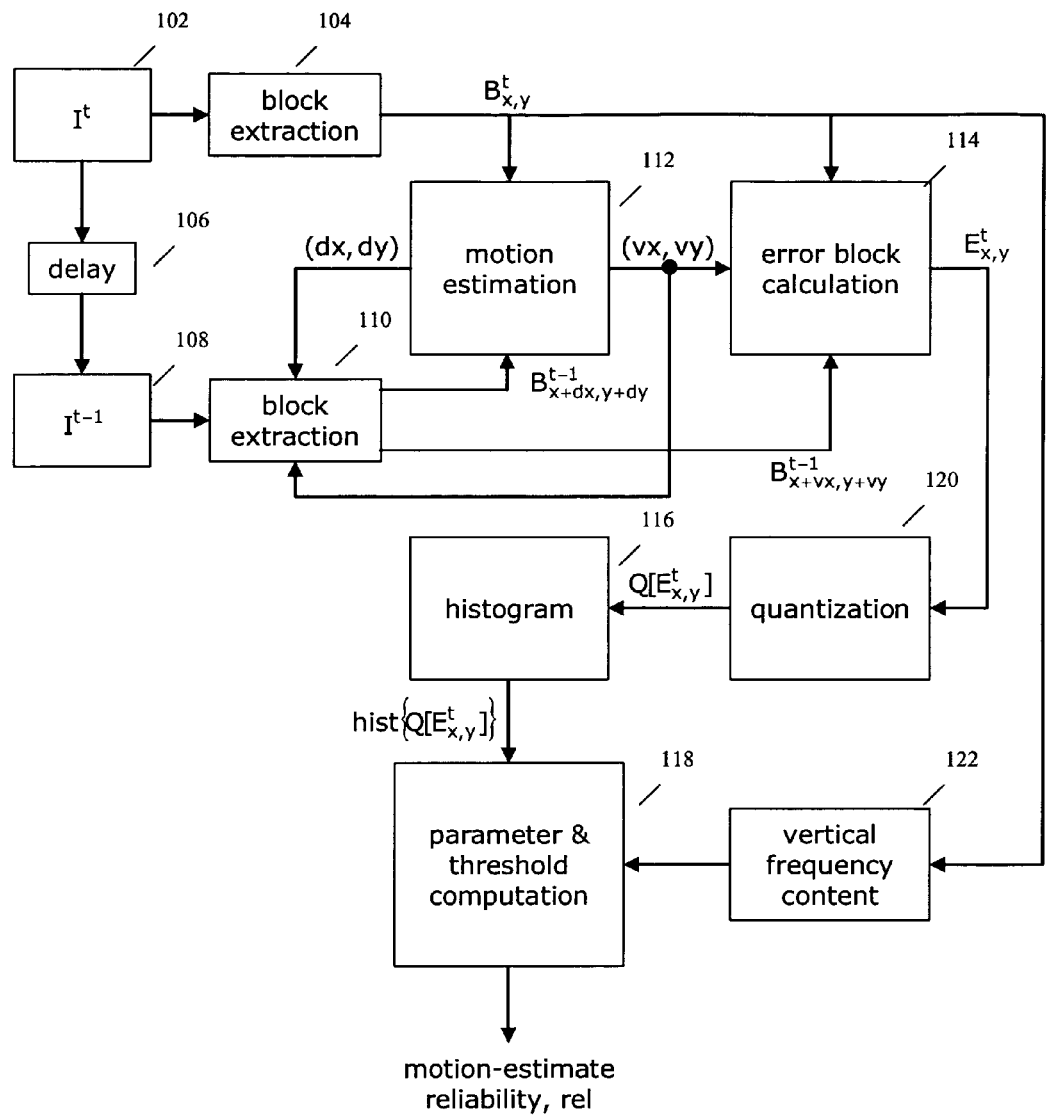
FIG. 6 shows a functional block diagram of a system implementing a method for determining the reliability of estimated motion vectors, according to another embodiment of the present invention.

According to another embodiment of the present invention implemented by system 200 of FIG. 6 (which is a variation of system 100 of FIG. 5), the computed error-block $E_{x,y}{}^t$ from error block calculation unit 114 is passed through a quantization function, Q(.), implemented by the quantization unit 120 prior to the plotting of the histogram by histogram unit 116, wherein Q(.) quantizes all the elements/values of the error-block $E_{x,y}{}^t$. With this modification, the histogram unit 116 generates the histogram y(k) according to expression (5) below:

$$y(k) = \underset{k}{hist}(Q(E^t_{x,y}(i,j))), \quad k = 0, 1, \ldots, K-1. \quad (5)$$

It is also noted that a selective subset instead of all the available error values in the error block can be used in the computation of the histogram.

System 200 further implements dynamic adaptation of thresholds and parameters described above, based on image content. A specific example is the amount of vertical frequency in the image content (any suitable measure of vertical frequency can be employed) determined by the vertical frequency content unit 122. The vertical frequency content unit 122 provides an indicator, for example, a number between 0 and 100, with 0 representing no vertical frequency in the image content and 100 representing very high vertical frequencies in the image content. The amount of vertical frequency can be measured using various methods, examples of which are the Fourier transform, edge strength and number in the vertical direction, gradients in the vertical direction, etc.

Depending on the application, other modifications of system 100 may be employed to enhance the performance of the reliability estimation. The modifications listed here are useful in specific de-interlacing architectures.

It should be noted that the present invention is not restricted to the examples that are provided for clarity of presentation and ease of understanding. Further, though some of the provided examples assume the inclusion of some of the modifications listed above, the scope of the present invention is not restricted to the inclusion of any (including the ones described above) particular modifications.

For system 100 (and system 200), the process for computation of the reliability measure based on the above computed parameters in computation unit 118 includes the steps of:

1. Based on the value of the parameter pv, and its exact bin location, $pl_0$, tolerance factor $s_{tol}$, and thresholds $th_0$ and $th_m$, the value of pl can be obtained according to expressions (6) and (7) below:

$$s_{tol} = f_{pl}(pl_0, th_0), \quad (6)$$

wherein example of the function $f_{pl}(.)$ is the curve shown in FIG. 7A.

$$pl = \max\left(\left(\max_k(s_{tol} \cdot y(k)), k \in [0, th_{ml}], k \neq pl_{el}\right), pl_{el}\right). \quad (7)$$

2. Another decision-logic based on the computed pl value, the ep value, the vertical frequency content $fc_v$, thresholds $th_{ep1}$, $th_{ep2}$, $th_{ep3}$, and $th_{ep4}$, is then used to identify the bin index, $id_t$, of the histogram that indicates the start of the tail of the histogram, according to expression (8):

$$id_t = \begin{cases} f_{ep1}(pl, ep) & ep \in [th_{ep1}, th_{ep2}] \\ f_{ep2}(pl, ep) & ep \in [th_{ep2}, th_{ep3}] \\ f_{ep3}(fc_v) & ep \in [th_{ep}, th_{ep4}] \end{cases} \quad (8)$$

Figure 7B:
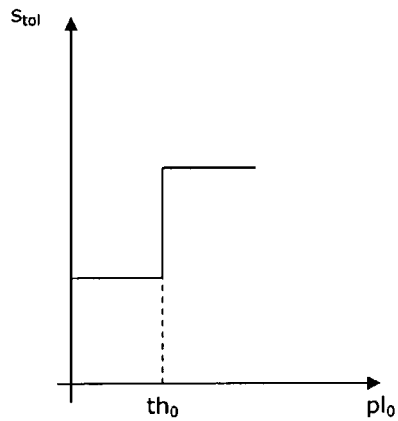
Figure 7B:
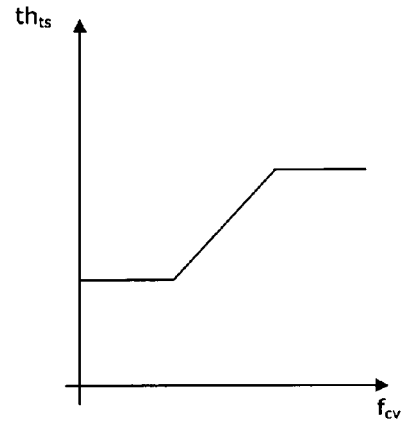
Figure 7B:
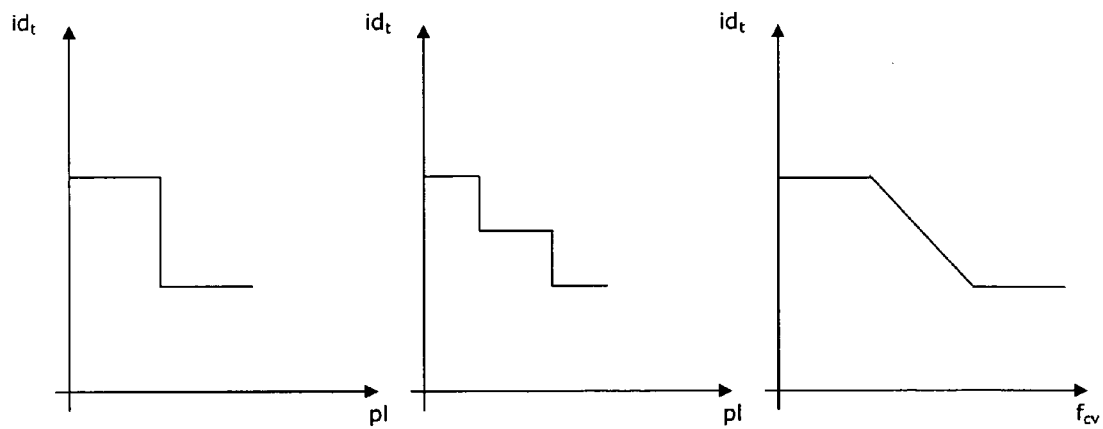

Examples of each of the functions $f_{ep1}(.)$, $f_{ep2}(.)$, and $f_{ep3}(.)$ are illustrated in FIG. 7B.

3. The parameter ts and threshold $th_{ts}$ are calculated according to expressions (9) and (10), respectively:

$$ts = \sum_{k=id_t}^{ep} y(k) \quad (9)$$

$$th_{ts} = f_{ts}(fc_v) \quad (10)$$

An example of the function $f_{ts}(.)$ is given in FIG. 7C. Threshold is an input to relation (11) below and is computed at this point.

4. Finally, the reliability measure (rel) is computed as a function of values $th_{ts}$ and ts calculated above according to function (11):

$$rel = f_{rel}(ts, th_{ts}), \quad (11)$$

where a simple implementation of the function $f_{rel}(.)$ is according to expression (12):

$$f_{rel}(\cdot) = \min\left(\left(1.0 - \frac{ts}{th_{ts}}\right), 1.0\right). \quad (12)$$

The various thresholds are heuristically computed and tuned based on the intended application.

Figure 1:
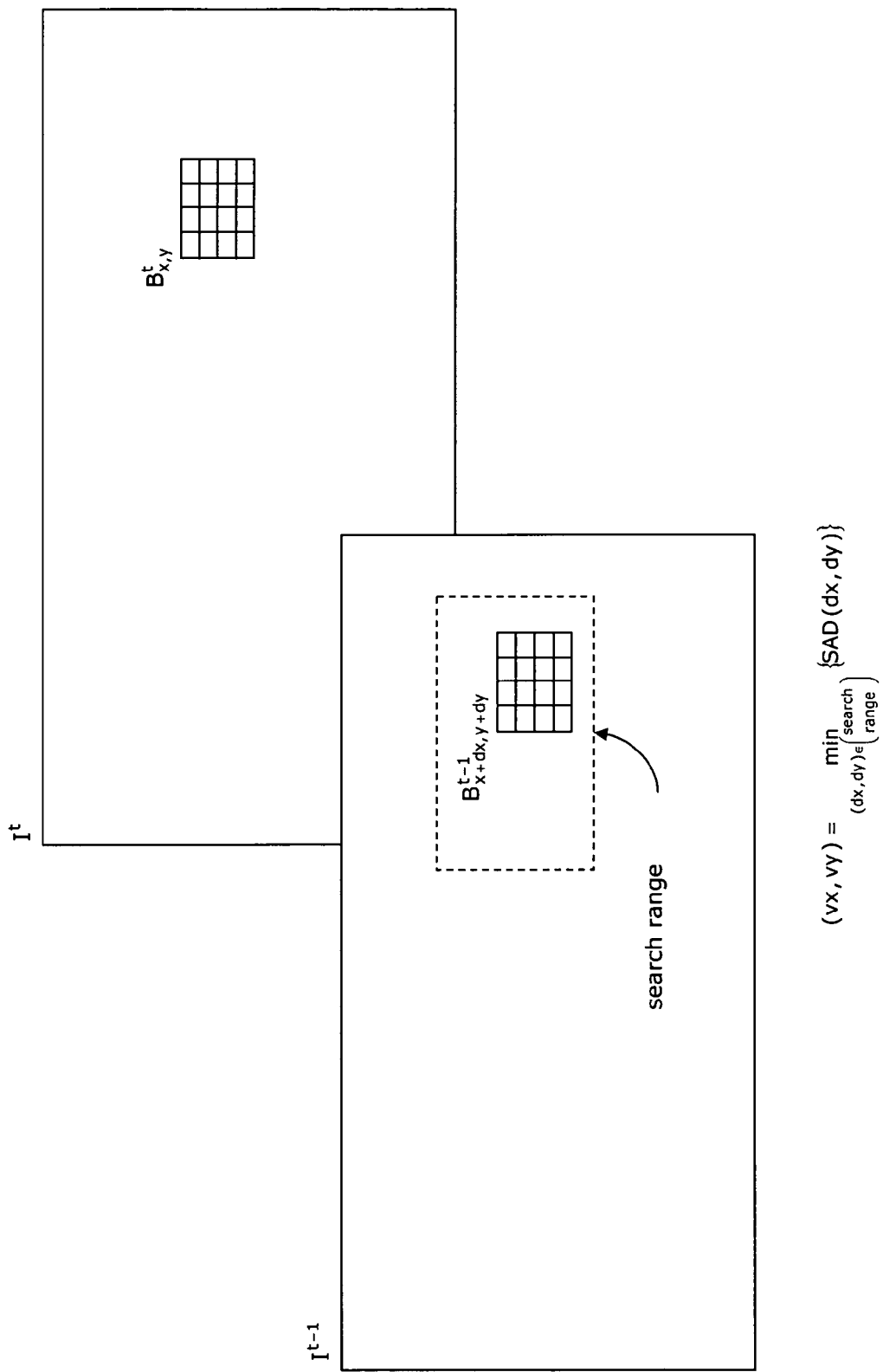
FIG. 1 illustrates a method of block-matching based motion estimation.
Figure 2:
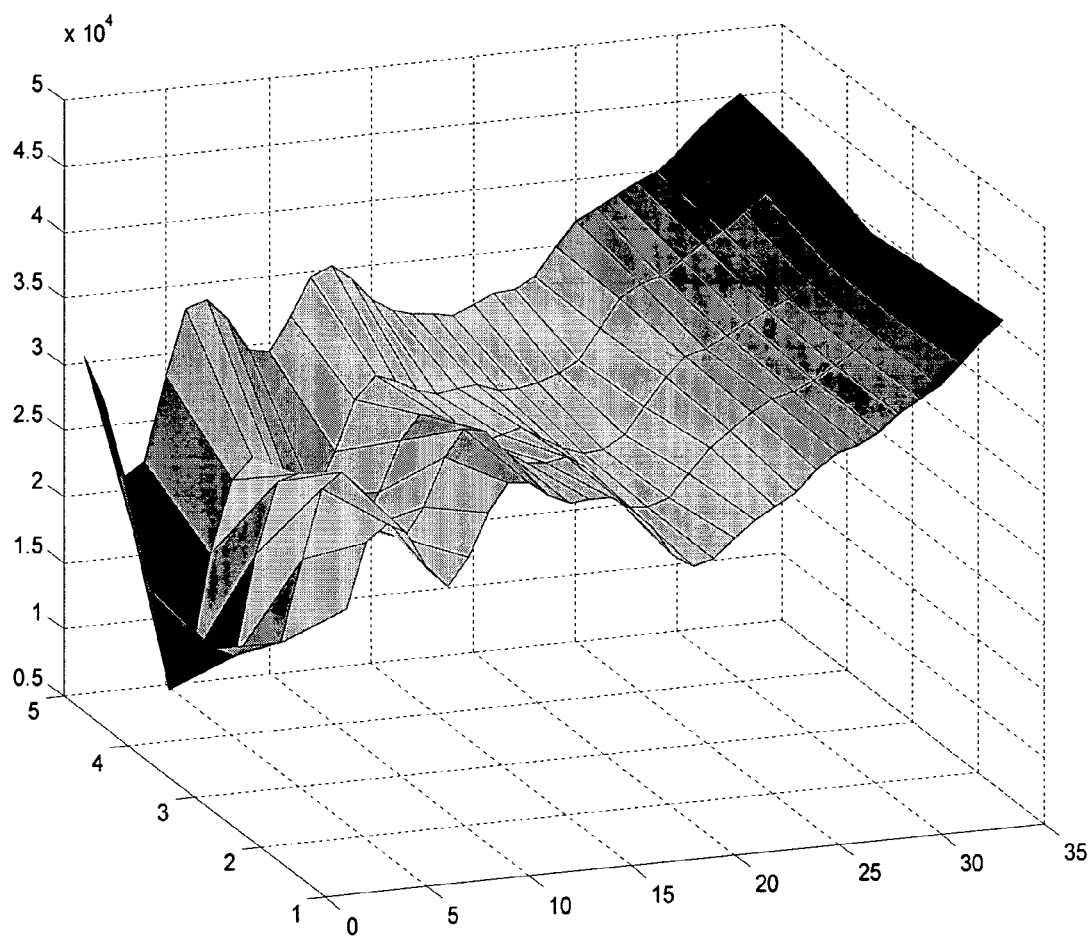
FIG. 2 shows a SAD surface and lists the minimum SAD value and the corresponding motion vector for one block in an example video sequence for the case when the estimated motion vector represents the true motion.
Figure 3:
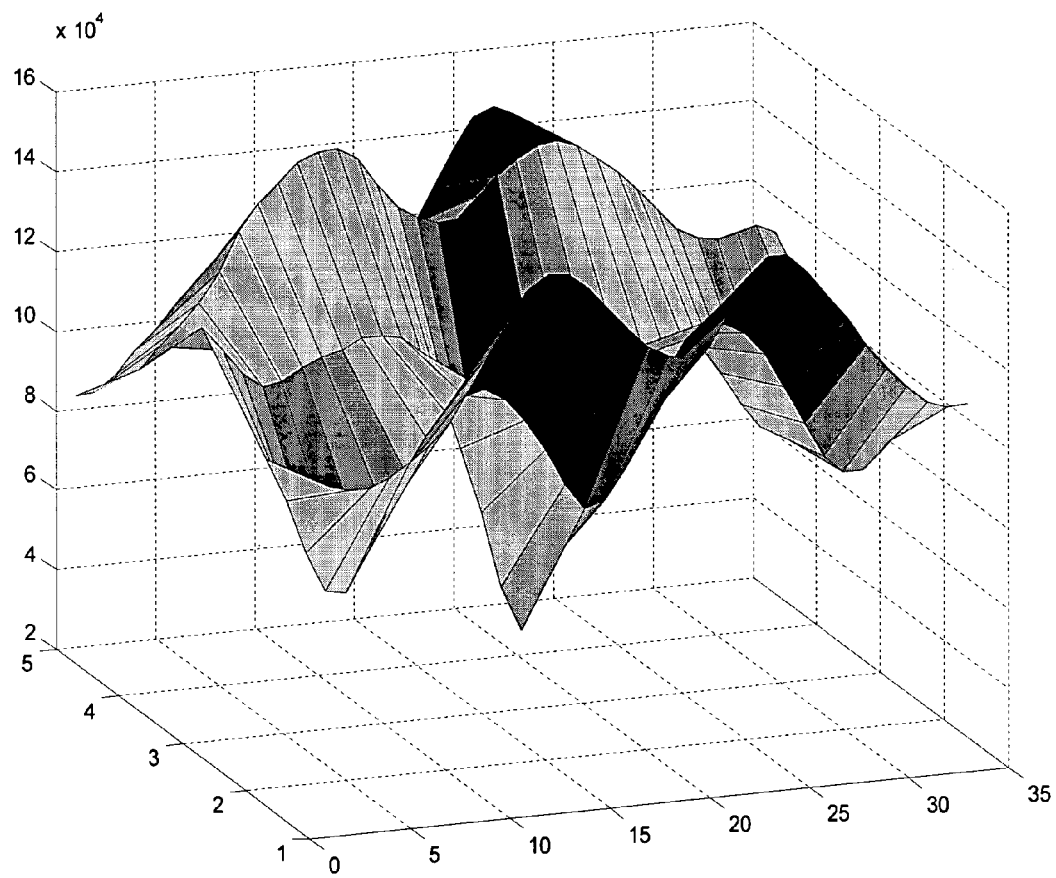
FIG. 3 shows a SAD surface and lists the minimum SAD value and the corresponding motion vector for one block in another example video sequence for the case when the estimated motion vector represents the true motion.
Figure 4:
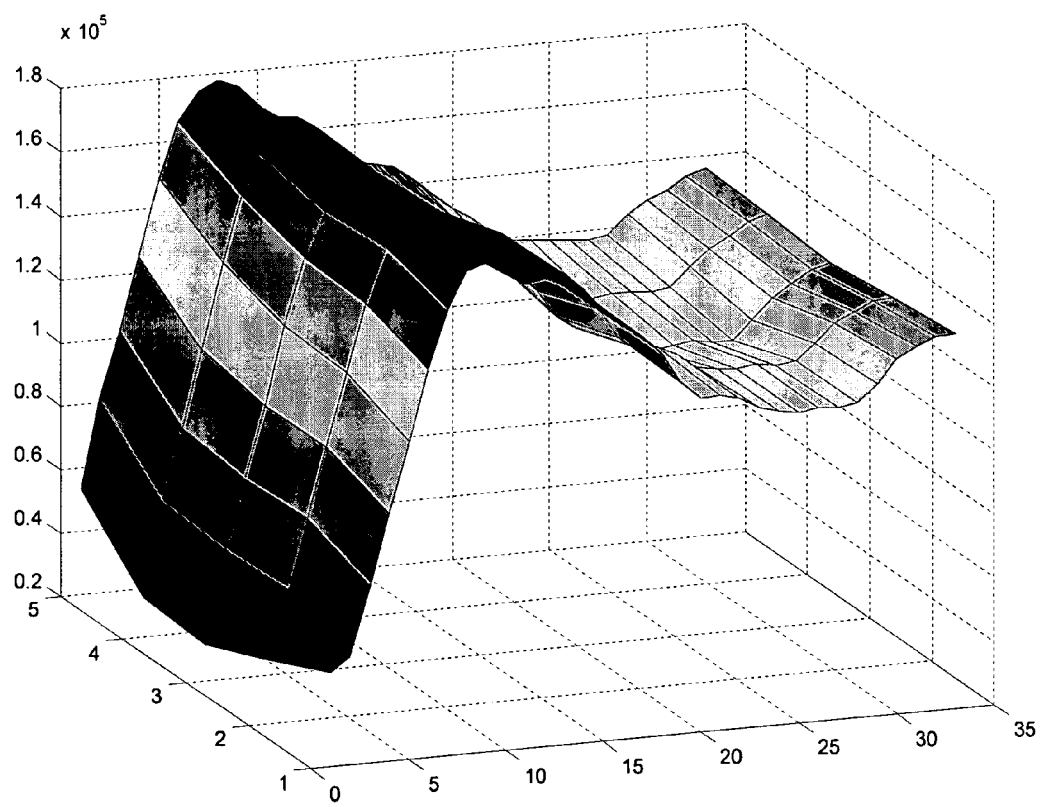
FIG. 4 shows a SAD surface and lists the minimum SAD value and the corresponding motion vector for one block in an example video sequence for the case when the estimated motion vector is unreliable due to multiple object motion within the block.
Figure 8:
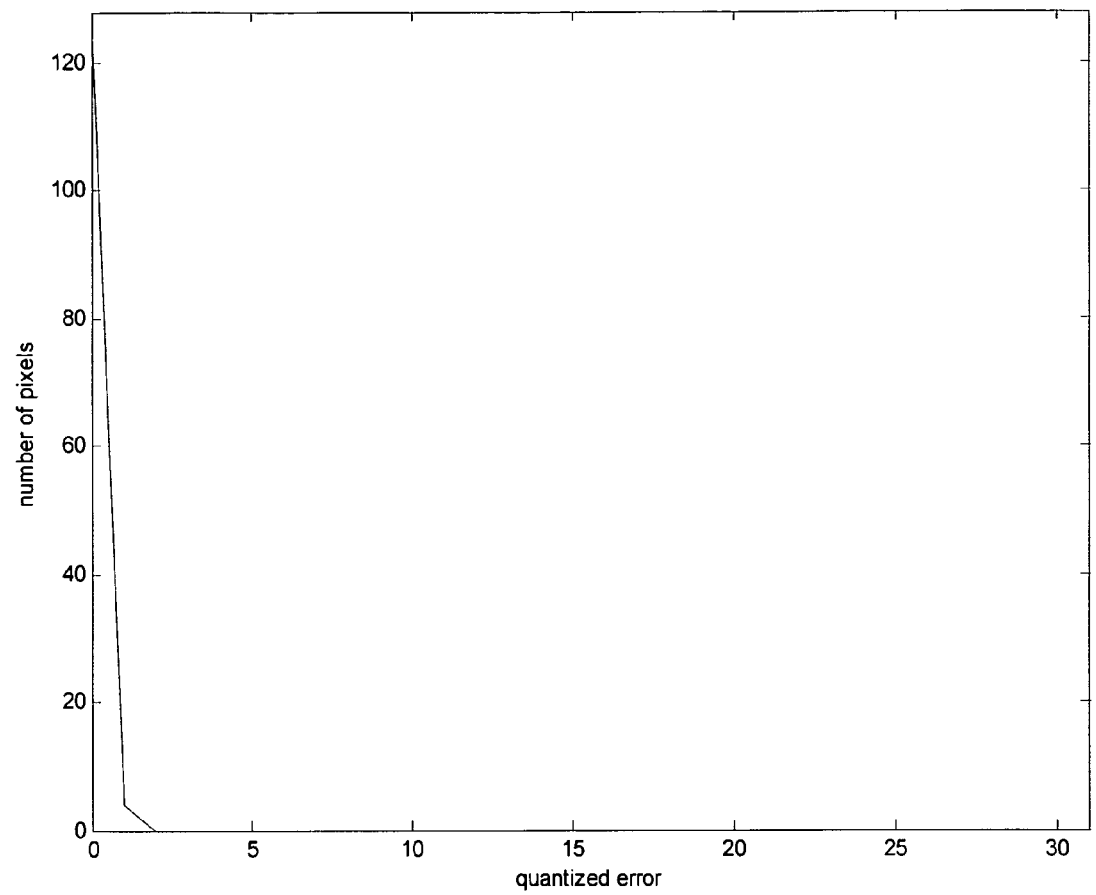
FIGS. 8, 9, and 10 show error histograms and computed parameters/values for the SAD surfaces of FIGS. 2, 3, and 4, respectively.
Figure 9:
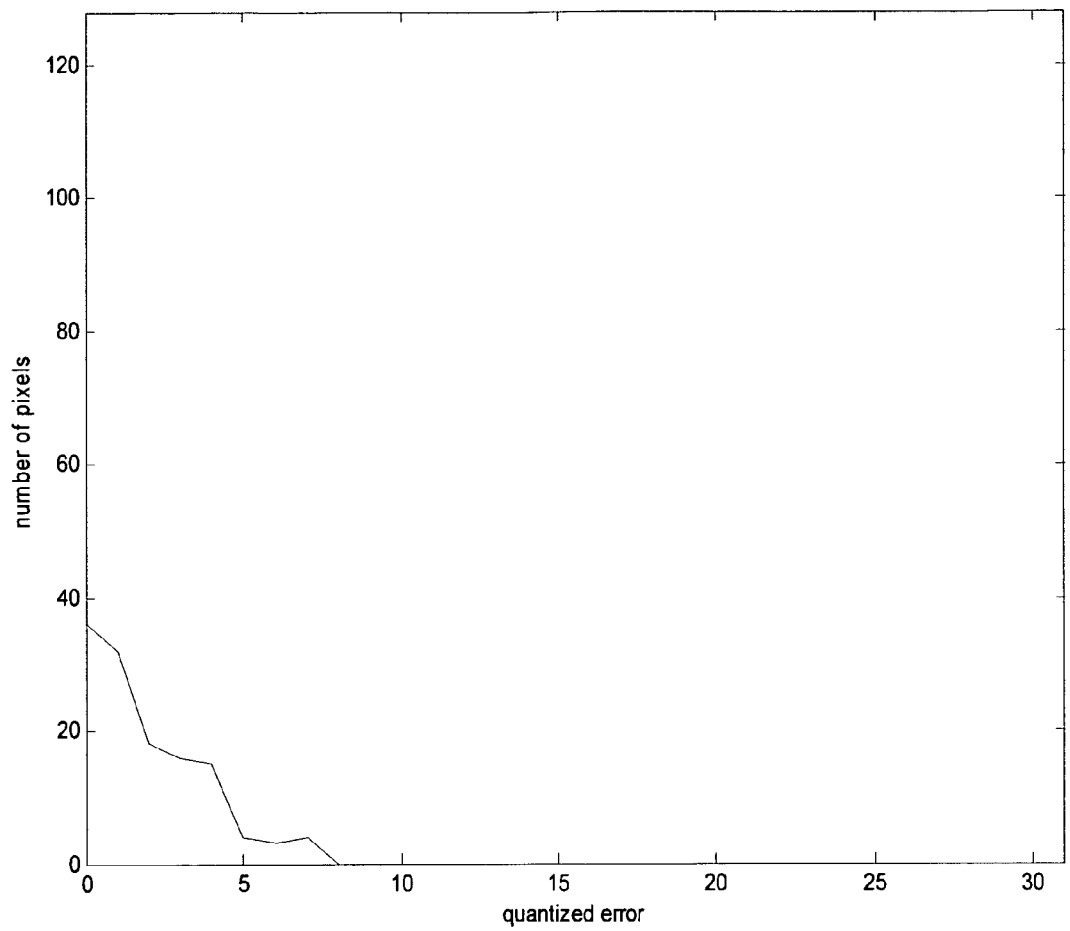
Figure 10:
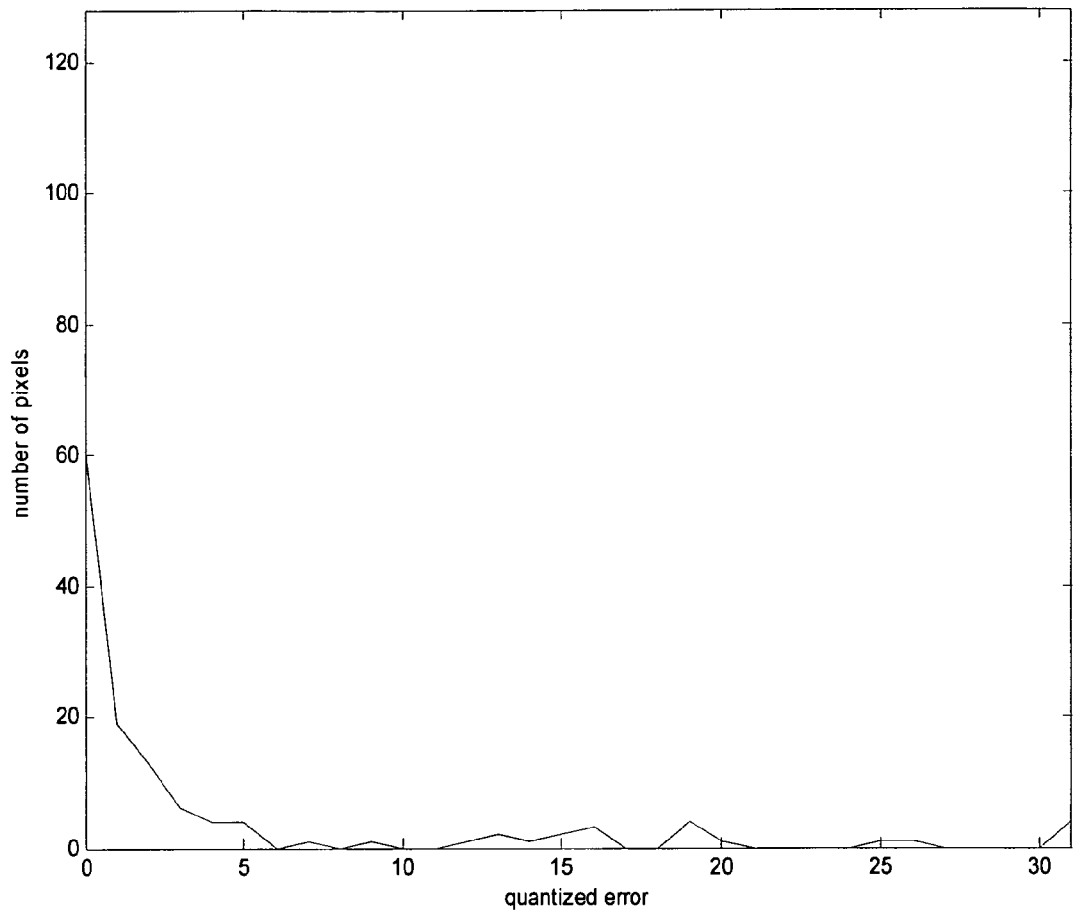

The error histograms and the computed parameters/values for the SAD surfaces shown in FIGS. 2, 3, and 4, are illustrated in FIGS. 8, 9, and 10, respectively, according to embodiments of the present invention. The error histograms shown in FIGS. 9 and 10 have different characteristics even though the SAD values for the two cases are in the same range. Thus, the accuracy of motion estimates can be better determined based on the error histograms than on the SAD values. Even though the case illustrated in FIGS. 4 and 10 (which represents an inaccurate motion estimate and a poor match) has a lower SAD value than the case illustrated in FIGS. 3 and 9 (which represents an accurate motion estimate), it is correctly classified as unreliable by the error histogram analysis according to an embodiment of the present invention. At the same time, the cases with correct motion estimates and good matches are classified as reliable irrespective of their large variation in SAD values.

Optional Modifications

Subsequent to computation of the reliability measure of the estimated motion vector for a given image block of pixels, as described above, optionally a final adjustment/modification of the obtained reliability measure based on the reliability measures and parameters computed for neighboring regions/blocks, can be implemented. To avoid the introduction/propagation of errors due to comparison of computed values of the current block with those of its neighboring blocks, the set of neighbors blocks selected for adjustment/modification of the computed reliability measure (of the current block) should satisfy relatively more stringent conditions for reliability. After selection of a suitable set, a similarity metric between the current parameters/values and those of the most reliable neighbor can be calculated and the reliability measure of the current block can be accordingly modified if necessary.

Figure 11:
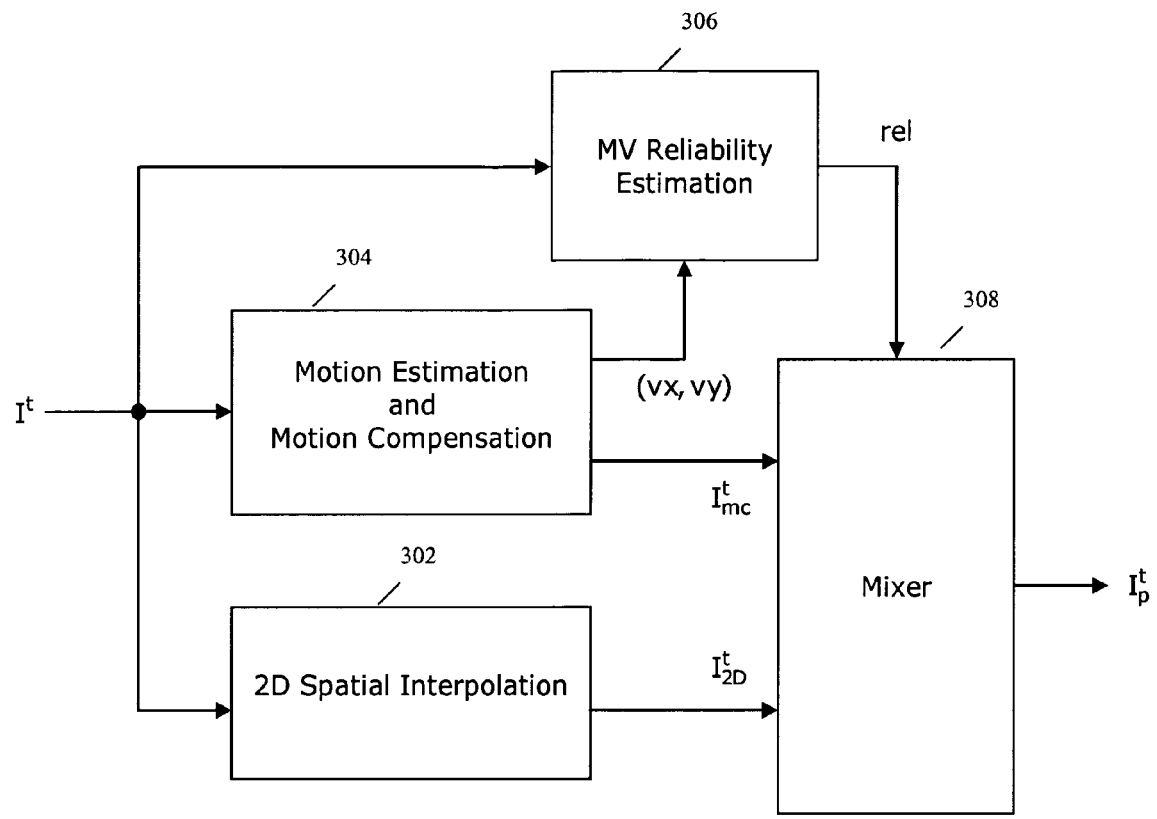
FIG. 11 shows a functional block diagram of an example de-interlacing system, according to an embodiment of the present invention.

As a specific example of a system where the present invention can be employed to enhance the output de-interlaced image quality by correctly identifying the reliability of the computed motion vectors (incorrect motion vectors cause visual artifacts whereas correct motion vectors provide good quality output), consider a simple de-interlacing system represented by the block diagram shown in FIG. 11. The example de-interlacing system 300 implements a method for determining the reliability of estimated motion vectors, according to an embodiment of the present invention. The input $I^t$ represents the current video field to be de-interlaced. A 2D Spatial Interpolation (2D-SI) based de-interlacing unit 302 and a Motion Estimation/Motion Compensation (ME/MC) based de-interlacing unit 304, are used.

In one example, the 2D-SI unit 302 implements vertical averaging of the previous and next field lines in $I^t$ to obtain the missing line in the current video field $I^t$. A more sophisticated 2D-SI unit 302 is one which determines the direction of the edge at each pixel location and interpolates along the edge if the pixel is deemed to belong to an edge, and reverts to vertical averaging in other cases.

An example of an ME/MC based de-interlacing unit 304 is one in which the missing lines are filled in from previous motion-compensated fields, with the motion being calculated by methods such as block-matching.

Each of the 2D-SI and ME/MC de-interlacing methods has its advantages and drawbacks, and as a result a mixer 308 is utilized to provide a mixed result that yields the best possible output quality. In such an application, a motion vector reliability (rel) is computed by an MV reliability estimation unit 306 implemented as described above, wherein rel is used as a parameter to determine the mixing ratio in the mixer 308.

Areas with greater reliability value have greater percentage of the output, $I_{mc}^t$, of the ME/MC unit 304, whereas areas with lower reliability have greater percentage of the output, $I_{2D}^t$, of the 2D-SI unit 302. $I^t{}_{mc}$ represents the de-interlaced output for input field $I^t$ obtained using the ME/MC de-interlacing method. $I^t{}_{2D}$ represents the de-interlaced output for input field $I^t$ obtained using the 2D-SI de-interlacing method.

The mixer 308 implements expression (13) below to generate the mixed output $I^t_p$, wherein:

$$I_p^t = \mathrm{mix}(I_{mc}^t, I_{2D}^t, \mathrm{rel}) \quad (13)$$

An example of the mix(.) function is a linear mixing function according to expression (14) below:

$$I_p^t = \alpha_{mc} \cdot I_{mc}^t + \alpha_{2D} \cdot I_{2D}^t \quad (14)$$

with $\alpha_{mc} + \alpha_{2D} = 1$, and $\alpha_{mc} = \mathrm{rel}$.

The motion vector reliability value, rel, can be determined as described above (e.g., as in expression (12))

Other examples of the mixing function are also possible. Another example of the mixing function is $$I_p^t = \alpha_{mc} \cdot I_{mc}^t + \alpha_{2D} \cdot I_{2D}^t \quad (15)$$

$$\text{with } \alpha_{mc} + \alpha_{2D} = 1, \quad \alpha_{mc} = \exp\left(1 - \frac{1}{rel}\right)$$

While the present invention is susceptible of embodiments in many different forms, these are shown in the drawings and herein described in detail, preferred embodiments of the invention with the understanding that this description is to be considered as an exemplification of the principles of the invention and is not intended to limit the broad aspects of the invention to the embodiments illustrated. The aforementioned example architectures above according to the present invention can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for determining the reliability of a motion vector estimating motion of pixels in a current video frame relative to another video frame in a video sequence, comprising the steps of:
   receiving a motion vector representing a motion estimate;
   determining an error block based on the motion vector;
   generating a histogram from one or more elements of the error block;
   determining a measure of reliability of the motion vector based on the histogram of the error block; and
   wherein calculating an error block $E_{x,y}^t$ based on a motion estimate, (vx, vy), and the blocks $B_{x,y}^t$ and $B_{x+vx,y+vy}^{t-1}$;
   wherein $B_{x,y}^t$ represents a block at location (x, y) in the current frame $I^t$ of size m×n pixels, and $B_{x+vx,y+vy}^{t-1}$ represents a block displaced from location (x, y) by (vx, vy) in the previous frame $I^{t-1}$ of the same size; and
   wherein the error block $E_{x,y}^t$ is calculated as:

$$E_{x,y}^t(i,j) = B_{x,y}^t(i,j) - B_{x+vx,y+vy}^{t-1}(i,j),$$

where i=x,x+1, . . . ,x+m−1,j=y,y+1, . . . ,y+n−1.

2. The method of claim 1 wherein the step of determining a measure of reliability of the motion vector further includes the steps of:
   determining a measure of reliability of the motion vector based on the histogram of the error block, taking into account some aspects of the current video frame content.

3. The method of claim 1 wherein the step of determining a measure of reliability of the motion vector further includes the steps of classifying the motion vector as reliable when the SAD value corresponding to the best motion estimate is high based on image content.

4. The method of claim 3 wherein the step of determining a measure of reliability of the motion vector further includes the steps of classifying the motion estimates in areas which fall at the boundary of objects with different motion, as unreliable even if the SAD surface does not exhibit a very high value at the location corresponding to the best motion estimate.

5. The method of claim 2 further comprising the steps of:
   quantizing the error block and then generating a histogram from one or more elements of the quantized error block.

6. The method of claim 5 further comprising the steps of:
   dynamically characterizing the histogram y(k) based on image content.

7. The method of claim 6 wherein the step of dynamically characterizing the histogram y(k) further includes the steps of:
   characterizing the histogram y(k) based on one or more of the following parameters that are dynamically adapted based on image content:
   an end point parameter, ep, which represents the last nonzero bin in the histogram and provides a measure of the spread and magnitude of errors for the motion vector;
   a peak value parameter, pv, which represents the maximum height, among all bins, of the histogram y(k) and is an indicator of the quality of the match between the original block $B_{x,y}^t$ and the best matched block $B_{x+vx,y+vy}^{t-1}$, obtained using the motion estimate (vx,vy), and the spread of the histogram y(k); and
   a peak location parameter, pl, which represents the most frequently occurring error range in the computer error block $E_{x,y}^t$ obtained from the motion vector;
   a tail strength parameter, ts, which represents the histogram y(k) contained in the part identified as the tail of the histogram y(k) and provides an indication of the degree of mismatch in the motion vector.

8. The method of claim 7 wherein the step of dynamically adapting further includes the steps of dynamically adapting one or more of said parameters based on high frequency image content.

9. The method of claim 1 wherein the step of generating a histogram from the obtained elements of the error block further includes the steps of:
generating a histogram y(k) from the obtained elements of the computed error block $E_{x,y}^t$.

10. The method of claim 9 wherein the steps of generating the histogram y(k) further includes the steps of determining the sample values of the histogram y(k), assuming K bins, as:

$$y(k) = \underset{k}{hist}(E_{x,y}^t(i,j)), \quad k = 0, 1, \ldots, K-1.$$

11. The method of claim 10 further comprising the steps of characterizing the histogram y(k) based on an end point parameter, ep, which represents the last non-zero bin in the histogram and provides a measure of the spread and magnitude of errors for the motion vector.

12. The method of claim 10 further comprising the steps of characterizing the histogram y(k) based on a peak value parameter, pv, which represents the maximum height, among all bins, of the histogram y(k) and is an indicator of the quality of the match between the original block $B_{x,y}^t$ and the best matched block $B_{x+vx,y+vy}^{t-1}$, obtained using the motion estimate (vx,vy), and the spread of the histogram y(k).

13. The method of claim 10 further comprising the steps of characterizing the histogram based on a peak location parameter, pl, which represents the most frequently occurring error range in the computed error-block $E_{x,y}^t$.

14. The method of claim 13 further comprising the steps of giving preference to bins representing higher error ranges, up to a pre-determined bin index.

15. The method of claim 10 further comprising the steps of characterizing the histogram based on a tail strength parameter, ts, which represents the histogram y(k) contained in the part identified as the tail of the histogram y(k) and provides an indication of the degree of mismatch in the motion vector.

16. The method of claim 10 further comprising the steps of characterizing the histogram y(k) based on one or more of:
an end point parameter, ep, which represents the last non-zero bin in the histogram and provides a measure of the spread and magnitude of errors for the motion vector;
a peak value parameter, pv, which represents the maximum height, among all bins, of the histogram y(k) and is an indicator of the quality of the match between the original block $B_{x,y}^t$ and the best matched block $B_{x+vx,y+vy}^{t-1}$, obtained using the motion estimate (vx,vy), and the spread of the histogram y(k); and
a peak location parameter, pl, which represents the most frequently occurring error range in the computed error-block $E_{x,y}^t$ obtained from the motion vector;
a tail strength parameter, ts, which represents the histogram y(k) contained in the part identified as the tail of the histogram y(k) and provides an indication of the degree of mismatch in the motion vector.

17. The method of claim 16 further including the steps of determining the value of pl based on:
value of the parameter pv, and its exact bin location, $pl_0$, tolerance factor $s_{tol}$, and
thresholds $th_0$ and $th_m$.

18. The method of claim 17 wherein:

$s_{tol} = f_{pl}(pl_0, th_0)$, and $$pl = \max\left(\left(\max_k(s_{tol} \cdot y(k)), k \in [0, th_{ml}], k \neq pl_{el}\right), pl_{el}\right).$$

19. The method of claim 16 further including the steps of determining the value of the bin index, $id_t$, of the histogram that indicates the start of the tail of the histogram.

20. The method of claim 19 further including the steps of determining the value of identify the bin index, $id_t$, based on:
the pl value,
the ep value,
vertical frequency content $fc_v$,
thresholds $th_{ep1}$, $th_{ep2}$, $th_{ep3}$, and $th_{ep4}$.

21. The method of claim 20 wherein:

$$id_t = \begin{cases} f_{ep1}(pl, ep) & ep \in [th_{ep1}, th_{ep2}] \\ f_{ep2}(pl, ep) & ep \in [th_{ep2}, th_{ep3}] \\ f_{ep3}(fc_v) & ep \in [th_{ep3}, th_{ep4}] \end{cases}.$$

22. The method of claim 19 wherein further comprising the steps of determining the value of the parameter ts is calculated as:

$$ts = \sum_{k=id_t}^{ep} y(k).$$

23. The method of claim 22 wherein further comprising the steps of determining the reliability measure, rel, as:

$$rel = \min\left(\left(1.0 - \frac{ts}{th_{ts}}\right), 1.0\right),$$

wherein $th_{ts} = f_{ts}(fc_v)$.

24. A system for determining the reliability of a motion vector estimating motion of pixels in a current video frame relative to another video frame in a video sequence, comprising the steps of:
an error computation unit for determining an error block based on the motion vector;
a histogram generator for determining a histogram from the obtained elements of the error block;
a reliability computation unit for determining a measure of reliability of the motion vector based on the histogram of the error block; and
wherein the error computation unit calculates the an error block $E_{x,y}^t$ based on a motion estimate, (vx, vy), and the blocks $B_{x,y}^t$ and $B_{x+vx,y+vy}^{t-1}$;
wherein $B_{x,y}^t$ represents a block at location (x, y) in the current frame $I^t$ of size m×n pixels, and $B_{x+vx,y+vy}^{t-1}$ represents a block displaced from location (x, y) by (vx, vy) in the previous frame $I^{t-1}$ of the same size; and
wherein the error block $E_{x,y}^t$ is calculated as:

$E_{x,y}^t(i,j) = B_{x,y}^t(i,j) - B_{x+vx,y+vy}^{t-1}(i,j)$, where i=x,x+1, . . . ,x+m−1,j=y,y+1, . . . ,y+n−1.

25. The system of claim 24 wherein the reliability computation unit determines a measure of reliability of the motion vector based on the histogram of the error block, taking into account some aspects of the current video frame content.

26. The system of claim 25 wherein the histogram generator generates a histogram y(k) from elements of the computed error block $E_{x,y}{}^t$.

27. The system of claim 26 wherein the histogram generator determines the sample values of the histogram y(k), assuming K bins, as:

$$y(k) = \hist_k(E^t_{x,y}(i, j)), \quad k = 0, 1, \ldots, K - 1.$$

28. The system of claim 27 wherein the reliability computation unit includes a parameter and threshold computation unit for obtaining information about the shape of the histogram y(k) by determining an end point parameter, ep, which represents the last non-zero bin in the histogram and provides a measure of the spread and magnitude of errors for the motion vector.

29. The system of claim 27 wherein the reliability computation unit includes a parameter and threshold computation unit for obtaining information about the shape of the histogram y(k) by determining a peak value parameter, pv, which represents the maximum height, among all bins, of the histogram y(k) and is an indicator of the quality of the match between the original block $B_{x,y}{}^t$ and the best matched block $B_{x+vx,y+vy}{}^{t-1}$, obtained using the motion estimate (vx,vy), and the spread of the histogram y(k).

30. The system of claim 27 wherein the reliability computation unit includes a parameter and threshold computation unit for obtaining information about the shape of the histogram y(k) by determining a peak location parameter, pl, which represents the most frequently occurring error range in the computed error-block $E_{x,y}{}^t$ obtained from the motion vector.

31. The system of claim 30 wherein preference is given to bins representing higher error ranges, up to a pre-determined bin index.

32. The system of claim 27 wherein the reliability computation unit includes a parameter and threshold computation unit for obtaining information about the shape of the histogram y(k) by determining a tail strength parameter, ts, which represents the histogram y(k) contained in the part identified as the tail of the histogram y(k) and provides an indication of the degree of mismatch in the motion vector.

33. The system of claim 27 wherein the reliability computation unit includes a parameter and threshold computation unit for obtaining information about the shape of the histogram y(k) by determining one or more of:
- an end point parameter, ep, which represents the last non-zero bin in the histogram and provides a measure of the spread and magnitude of errors for the motion vector;
- a peak value parameter, pv, which represents the maximum height, among all bins, of the histogram y(k) and is an indicator of the quality of the match between the original block $B_{x,y}{}^t$ and the best matched block $B_{x+vx,y+vy}{}^{t-1}$, obtained using the motion estimate (vx,vy), and the spread of the histogram y(k); and
- a peak location parameter, pl, which represents the most frequently occurring error range in the computed error block $E_{x,y}{}^t$ obtained from the motion vector; and
- a tail strength parameter, ts, which represents the histogram y(k) contained in the part identified as the tail of the histogram y(k) and provides an indication of the degree of mismatch in the motion vector.

34. The system of claim 33 wherein the reliability computation unit determines the value of pl based on:
value of the parameter pv, and its exact bin location, $pl_0$,
tolerance factor $s_{tol}$, and
thresholds $th_0$ a.

35. The system of claim 34 wherein:

$s_{tol} = f_{pl}(pl_0, th_0)$, and $$pl = \max\left(\left(\max_k(s_{tol} \cdot y(k)), k \in [0, th_{ml}], k \neq pl_{el}\right), pl_{el}\right).$$

36. The system of claim 33 wherein the reliability computation unit further determines the value of the bin index, $id_t$, of the histogram indicating the start of the tail of the histogram.

37. The system of claim 36 wherein the reliability computation unit further determines the value of identify the bin index, $id_t$, based on:
the pl value,
the ep value,
vertical frequency content $fc_v$,
thresholds $th_{ep1}, th_{ep2}, th_{ep3}$, and $th_{ep4}$.

38. The system of claim 37 wherein the reliability computation unit determines $id_t$ as:

$$id_t = \begin{cases} f_{ep1}(pl, ep) & ep \in [th_{ep1}, th_{ep2}] \\ f_{ep2}(pl, ep) & ep \in [th_{ep2}, th_{ep3}] \\ f_{ep3}(fc_v) & ep \in [th_{ep3}, th_{ep4}] \end{cases}.$$

39. The system of claim 36 wherein the reliability computation unit further determines the value of the parameter is as:

$$ts = \sum_{k=id_t}^{ep} y(k).$$

40. The system of claim 39 wherein the reliability computation unit further determines the reliability measure, rel, as:

$$rel = \min\left(\left(1.0 - \frac{ts}{th_{ts}}\right), 1.0\right),$$

wherein $th_{ts} = f_{ts}(fc_v)$.

41. The system of claim 24 wherein the reliability computation unit determines a measure of reliability of the motion vector by classifying the motion vector as reliable when the SAD value corresponding to the best motion estimate is high based on image content.

42. The system of claim 41 wherein the reliability computation unit determines a measure of reliability of the motion vector by classifying the motion estimates in areas which fall at the boundary of objects with different motion, as unreliable even if the SAD surface does not exhibit a very high value at the location corresponding to the best motion estimate.

43. A method of processing interlaced video including a sequence of interlaced image frames, comprising the steps of:
estimating a motion vector for a block of pixels in a current image frame including multiple blocks, wherein the motion vector estimates motion of pixels in a current video frame relative to another video frame in a video sequence;

determining the reliability of the motion vector;

reconstructing a pixel value in the block based on the reliability of the motion vector includes the steps of:

receiving current video field to be de-interlaced $I^t$;

spatially interpolating a missing pixel value in $I^t$, to obtain a first value $I_{2D}^t$;

determining the missing pixel value from previous motion-compensated fields, to obtain a second value $I_{mc}^t$; and combining the first and the second value as a function of the reliability, rel, of the motion vector to reconstruct said pixel value $I_p^t$ as:

$I_p^t = \text{mix}(I_{mc}^t, I_{2D}^t, \text{rel})$.

44. The method of claim 43 wherein the step of determining the reliability of the motion vector further includes the steps of:

determining an error block based on the motion vector;

generating a histogram from one or more elements of the error block; and determining a measure of reliability of the motion vector based on the histogram of the error block.

45. The method of claim 44 wherein the step of determining a measure of reliability of the motion vector further includes the steps of:

determining a measure of reliability of the motion vector based on the histogram of the error block, taking into account some aspects of the current video frame content.

46. The method of claim 44 wherein the step of determining a measure of reliability of the motion vector further includes the steps of classifying the motion vector as reliable when the SAD value corresponding to the best motion estimate is high based on image content.

47. The method of claim 46 wherein the step of determining a measure of reliability of the motion vector further includes the steps of classifying motion estimates in areas which fall at the boundary of objects with different motion, as unreliable even if the SAD surface does not exhibit a very high value at the location corresponding to the best motion estimate.

48. The method of claim 43 wherein mix(.) comprises a linear mixing function.

49. The method of claim 48 wherein the mixing function is such that:

$I_p^t = \alpha_{mc} \cdot I_{mc}^t + \alpha_{2D} \cdot I_{2D}^t$, wherein $\alpha_{mc} + \alpha_{2D} = 1$, and $\alpha_{mc} = \text{rel}$.

* * * * *